May 6, 1958  H. E. HANDLEY  2,833,267
COMBINATION WATER HEATER AND SPACE HEATER
Filed May 26, 1954
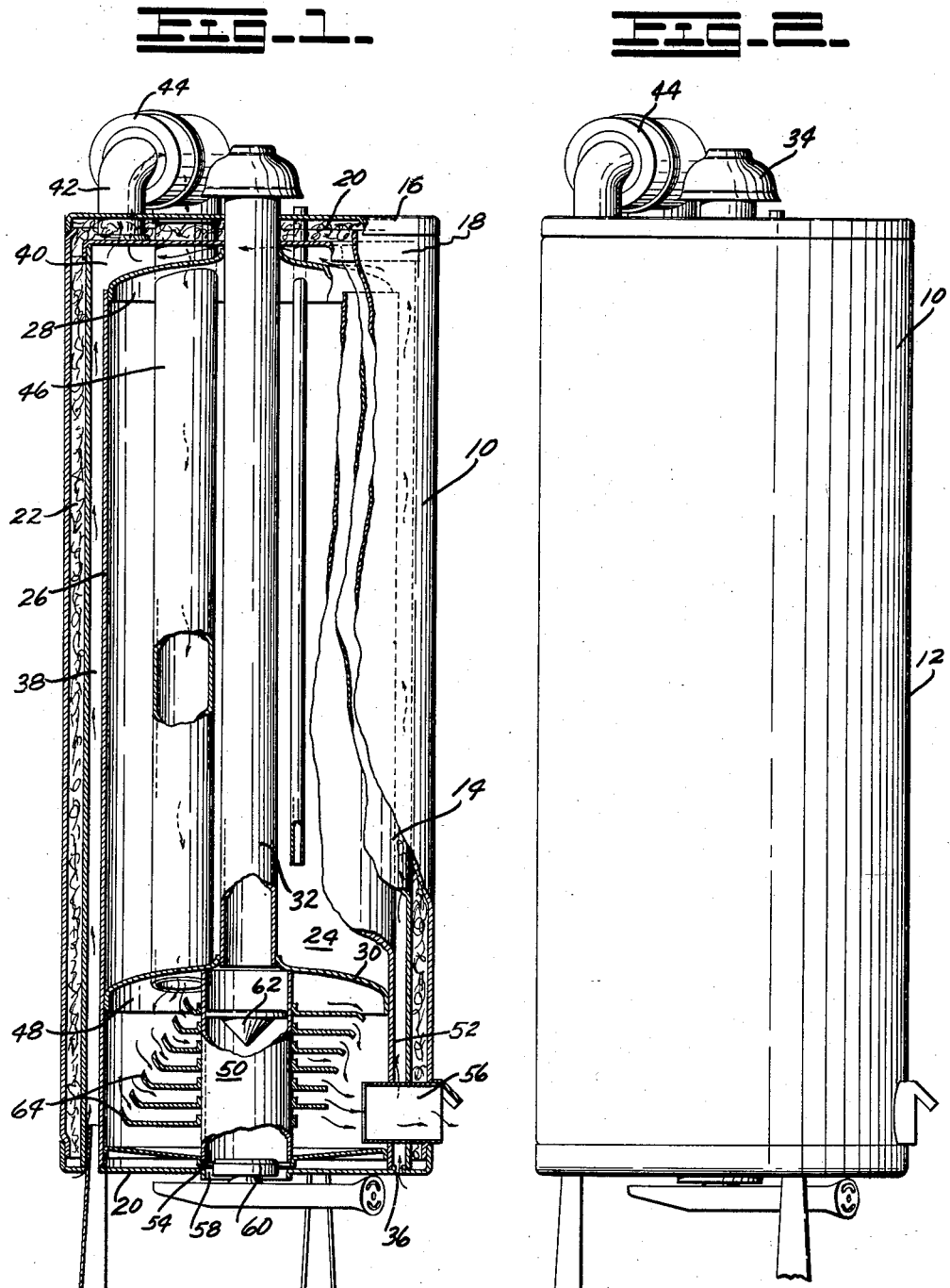
INVENTOR
Harold E. Handley
BY
ATTORNEY ём
United States Patent Office 2,833,267
Patented May 6, 1958

2,833,267

COMBINATION WATER HEATER AND SPACE HEATER

Harold E. Handley, Jackson, Mich., assignor to Handley Brown Heater Company, Jackson, Mich., a corporation of Michigan Application May 26, 1954, Serial No. 432,557

5 Claims. (Cl. 126—101)

The present invention relates to combination space and water heaters, being an improvement upon the type of apparatus disclosed in United States Patent No. 2,658,502, granted November 10, 1953.

It has been heretofore proposed to provide heating apparatus capable of supplying hot water as well as a limited amount of space heating for installation in milk houses upon dairy farms and other small rooms and living spaces where it is convenient to locate a water heater and space heating is also desirable. However, such apparatus as has appeared upon the market has been so designed as to materially sacrifice efficiency in a water heater as well as being an inadequate source for space heating.

According to the present invention, I have provided a gas fired apparatus of the type described which, by way of example, has 30 gallon hot water storage capacity and an hourly warm air output of 14,000 B. t. u. at 120 cu. ft. per min. yet in appearance and size is very comparable to a standard domestic 30 gallon gas hot water heater. In the example given the gas burner has a capacity of 25,000 B. t. u. with the water heater having an hourly recovery at 100° temperature rise of 21 gallons.

In the illustrated form of the invention the hot water storage tank is elongated and vertically disposed. The standard form of insulation for tanks of such construction, in lieu of being in direct contact with the exterior wall of the tank, has been spaced therefrom to provide an annular passage through which the inlet air is vertically drawn with intimate wiping contact with the major portion of the exterior wall of the tank. The inlet air, thus warmed by its contact with the exterior wall of the hot water tank, is then preferably directed downwardly through a conduct located within the tank and in heat exchange relation with the hot water therein to pass in heat exchange relation with the combustion chamber beneath the tank prior to being discharged at adjacent floor level.

In the preferred form of the invention it will be noted that the inlet air first contacts the lowest temperature portion of the tank, is gradually warmed and then subjected to the high heat of the combustion chamber just prior to discharge. This has the further advantage of providing a thermal balance within the air passages with the result that there is no flow of air through the apparatus during standby periods with the room thermostat satisfied and the air blower at rest. This arrangement accounts for the efficiency of the apparatus solely as a water heater.

Thus an object of the invention is to provide a combination water and space heater of the type described having improved efficiency and capacity.

Another object is to provide an apparatus of the type described in which the heated air is first brought into heat exchange relation with the exterior of the water tank, then with the interior of the tank, and finally with the combustion chamber prior to discharge.

A further object of the invention is to provide a combination space and water heater having an improved reverse air flow arrangement for the circulation of the air being heated.

A still further object is to provide a practical, efficiency water heater for year around use yet having substantial standby space heating capacity when temperature conditions require its function as such.

A still further object of the invention is to provide an apparatus of the type described in which the air passages and air blower are so arranged and constructed that the surfaces through which heat exchange takes place are subjected to uniform flow and short circuiting of air flow is held to a minimum and maximum heat transfer takes place during the period of blower operation.

These and other objects and advantages residing in the combination, construction and arrangement of parts will more fully appear from the following specification and claims.

In the drawings,

Fig. 1 is a side elevational view of the combination space and water heater, and Fig. 2 is a vertical cross sectional view of Fig. 1.

Referring to the illustrated embodiment, the apparatus 10 comprises nested outer and inner jackets 12 and 14 closed at their top by jacket ends 16 and 18 and at their lower end by a bottom member 20. Suitable insulation 22 is confined between the spaced jackets.

The hot water storage tank 24 has an elongated outer shell 26, an upper head 28, a lower head 30 and a centrally located flue gas passage 32 which extends through the insulated jacket to connect through the down draft deflector 34 with a suitable stack (not shown).

Suitable openings 36 in the bottom 20 register with the annular vertical air passage 38 between the jacket 14 and shell 26 of the tank 24. Cold air is drawn upwardly into the space 40 and from there to the inlet pipe 42 of the electric air blower 44, the discharge of which connects with the air passage 46 mounted between and opening through the heads 28 and 30 of the tank 24.

The lower end of the passage 46 discharges into an annular heat exchange chamber 48 concentric with the combustion chamber 50 and defined by the skirt 52, bottom 20, head 30 and shell 54 of the combustion chamber 50. A hot air discharge 56 opening into the chamber 48 is provided adjacent the floor level from which the air may be directly discharged into the space being heated or conducted to a remote point by suitable conduit (not shown).

The combustion chamber 50 connects with the flue gas passage 32 at its upper end and with the atmosphere at its lower end through the opening 58 in the bottom 20. A suitable gas burner 60 is shown disposed in the opening 58 with the direct passage of the products of combustion to the flue gas passage 32 being interrupted by the inverted conical deflector 62.

Supported in spaced stacked relation from the exterior wall of the shell 50 are combination annular baffles and heat conducting fine 64 shaped and arranged to uniformly gather the air discharged into the chamber 48 from the passage 46 and to direct it to the discharge 56 in good heat exchange relationship with the combustion chamber 50.

As will be readily appreciated to those skilled in the art, with the blower 44 inactive the temperature of the air in the passages 38 and 46 will be substantially the same to produce a thermal balance. Under such condition the thermal losses of my combustion apparatus will be comparable to a standard gas water heater with similar efficiency.

In practice the blower 44 will be thermostatically controlled and regulated by the temperature of the space to be heated. If desired, the space thermostat may be interlocked with the standard water temperature control to restrict the operation of the blower 44 only to period during which the water temperature is being maintained within a predetermined range.

Having thus described my invention what I claim as novel and desire to protect by Letters Patent is as follows:

1. A combination hot air space heater and water supply heater apparatus comprising a tank, air inlet means adjacent the lower end of said tank, means defining an insulated vertically extending air passage in heat exchange relation to the exterior wall of said tank and connecting with said inlet, means defining a vertical down flow air passage extending through the interior of said tank in heat exchange relation therewith and connecting with said first passage adjacent the upper end of said tank, air outlet structure connecting with the lower end of said down flow air passage at a level adjacent the level of said air inlet means, means for heating water stored within said tank, said passages being in substantial thermal balance to restrict air flow in said passages with said apparatus functioning solely as a water supply heater, and means associated with said passages for circulating air in said passages in heat-exchanging relation with said tank.

2. A combination air and water heater apparatus as defined in claim 1 wherein said heating means comprises a combustion chamber disposed at the lower end of said tank.

3. A combination air and water heater apparatus as defined in claim 2 wherein heat exchange construction is provided and embraces said combustion chamber and is located in the lower end of said down flow air passage adjacent said outlet.

4. A combination air and water heater apparatus as defined in claim 1 wherein said means includes a combustion chamber wall located below said tank, and one end of said down flow passage being in heat exchange relation with the combustion chamber through said wall with the exterior of said chamber wall partially defining said down flow passage.

5. A combination air and water heater apparatus as defined in claim 1 wherein said first air passage is defined by a shell embracing said tank in spaced relation thereto, said air circulating means being disposed above said shell and tank, and duct means connected between said air circulating means and said passages.

References Cited in the file of this patent
UNITED STATES PATENTS

| | | |
|---|---|---|
| 1,753,190 | Andrews | Apr. 8, 1930 |
| 2,006,849 | Warren | July 2, 1935 |
| 2,023,602 | Lithman | Dec. 10, 1935 |
| 2,225,023 | Watt | Dec. 17, 1940 |
| 2,470,571 | Miller | May 17, 1949 |
| 2,573,004 | Frank | Oct. 30, 1951 |
| 2,625,150 | Little | Jan. 13, 1953 |
| 2,643,323 | Carlson | June 23, 1953 |
| 2,654,361 | Loschung | Oct. 6, 1953 |
| 2,684,667 | Glasby | July 27, 1954 |

FOREIGN PATENTS

| | | |
|---|---|---|
| 581,028 | Great Britain | Sept. 27, 1946 |